US012637127B1

(12) United States Patent
    Ondrasik, Jr.

(10) Patent No.:  US 12,637,127 B1
(45) Date of Patent:      May 26, 2026

(54) NESTABLE SHOPPING CART WITH DROPPED BOTTOM CENTER WIRE

(71) Applicant: THE ONDRASIK FAMILY TRUST DATED 11/3/1999, Commerce, CA (US)

(72) Inventor: V. John Ondrasik, Jr., Granada Hills, CA (US)

(73) Assignee: THE ONDRASIK FAMILY TRUST DATED 11/3/1999, Commerce, CA (US)

( * ) Notice: Subject to any disclaimer, the term of this patent is extended or adjusted under 35 U.S.C. 154(b) by 0 days.

(21) Appl. No.: 19/413,488

(22) Filed: Dec. 9, 2025

Related U.S. Application Data

(60) Provisional application No. 63/757,213, filed on Feb. 11, 2025.

(51) Int. Cl.
B62B 3/14          (2006.01)
B62B 3/18          (2006.01)

(52) U.S. Cl.
CPC .............. B62B 3/1468 (2013.01); B62B 3/18 (2013.01)

(58) Field of Classification Search
CPC ......... B62B 3/1468; B62B 3/18; B62B 3/184; B62B 3/16; B62B 3/14
See application file for complete search history.

(56)                References Cited

U.S. PATENT DOCUMENTS 3,337,227 A * 8/1967 Castaldo ................... B62B 3/14
                                                    280/33.996
3,999,774 A * 12/1976 Rehrig ...................... B62B 3/14
                                                    280/33.991

FOREIGN PATENT DOCUMENTS

DE      102018104703 A1 * 9/2019 ........... B62B 5/0006

* cited by examiner

*Primary Examiner* — James A Shriver, II
*Assistant Examiner* — Nicholas R. Kandas
(74) *Attorney, Agent, or Firm* — David R. Heckadon; Gordon Rees Scully Mansukhani LLP

(57)                ABSTRACT

A nestable shopping cart with a bottom wire shelf that has a dropped bottom center wire. The dropped bottom center wire permits easy nesting with a second shopping cart such that the potential for damage to the wire rails of both shopping carts is reduced by the dropped bottom center wire on the first shopping cart contacting a shield on a bottom support of a second shopping cart.

18 Claims, 7 Drawing Sheets

NESTABLE SHOPPING CART WITH DROPPED BOTTOM CENTER WIRE

RELATED APPLICATION

The present invention application claims priority to U.S. Provisional Patent Application Ser. No. 63/757,213, of same title, filed Feb. 11, 2025, the entire disclosure of which is incorporated herein by reference in its entirety for all purposes.

TECHNICAL FIELD

The present invention relates to shopping carts.

BACKGROUND OF THE INVENTION

When shopping carts are nested together, both the large upper baskets and the lower shelves positioned approximately seven inches above the ground must also nest together. To nest the upper baskets, the back wall of the front cart rotates upward, allowing the front portion of the rear cart to be pushed into the rear of the front cart.

For much of the last century, when shopping carts were chrome-plated, the lower tray was attached to the tubular frame by inserting the front cross wire of the tray into holes in the tubing located just above and to the side of the front swivel wheels. The rear portion of the tray was angled upward so that, during nesting, the portion of the tubular frame of the rear cart—positioned above and in front of the front swivel wheels—would contact the slanted rear portion of the lower tray on the front cart, causing it to rotate upward and permit nesting.

Late in the twentieth century, chrome plating began to be replaced by powder coating. Because chrome is a hard surface while powder coating is relatively soft, the use of rotating lower trays in powder-coated carts resulted in excessive wear of the coating on both the bottom of the lower tray of the front cart and the upper surface of the front tubular frame of the rear cart. To address this issue, powder-coated shopping carts adopted a "flat" lower tray design welded to the tubular frame just above the front swivel wheels and slanted upward to the rear, where it is welded approximately two inches higher. This configuration prevents contact between the trays or frames of nested carts, thereby reducing coating wear. Additionally, the front end of the base can be dropped to provide protection, for example, against the shopping cart hitting a curb.

While effective in preventing wear, the flat, upward-slanting lower tray design creates new usability challenges. The reduced clearance—approximately five inches less between the bottom of the main basket and the top of the lower tray—makes it more difficult for shoppers to place or remove bulky items, such as packages of paper towels. In addition, items placed on an upward-slanting welded tray are more prone to sliding forward and falling off, whereas items on a downward-slanting rotating tray remain more securely in place.

Accordingly, there is a need for a system that allows the lower shelves of shopping carts to nest together without substantial wear of the powder coating, while retaining the advantages of the rotating lower tray design. The present invention provides such a system.

SUMMARY OF THE INVENTION

In preferred aspects, the present system provides a nestable shopping cart, comprising:

a wire frame basket having a front, a back, two sides and a bottom connected together;

a bottom support extending downwardly below the wire frame basket;

a bottom wire shelf connected to the bottom support, the bottom wire shelf being positioned below the wire frame basket, wherein the bottom wire shelf is rotatable with respect to the bottom support such that a rear portion of the bottom wire shelf can be raised when a bottom support of a second nestable shopping cart is received thereunder when the nestable shopping cart and the second nestable shopping cart are nested together;

wherein the bottom wire shelf includes a longitudinally extending wire having a portion that projects downwardly below the bottom wire shelf; and an optional shield on the bottom support, wherein the optional shield is positioned to contact the longitudinally extending wire that projects downwardly below the bottom wire shelf of the second nestable shopping cart.

In preferred aspects, the portion of the longitudinally extending wire that projects downwardly below the bottom wire shelf rubs against the shield on the bottom support of the second shopping cart when the two shopping carts are nested together. The advantage of this is that since only one wire on the bottom shelf projects downwardly, the remaining wires of the bottom wire shelf do not contact the bottom support of the second shopping cart when the carts are nested together. Preferably, the wire that projects downwardly is the center wire (running back to front) but need not be. Rather, in accordance with the present system, any one of the bottom shelf's wires can be the downwardly projecting one.

In preferred embodiments, the bottom wire shelf has a front portion posed generally slanted downwards to the ground, and an upwardly angled rear portion disposed at an angle to the ground. The advantage of having such an upwardly angled rear portion is that the bottom shelf of the rear shopping cart can be easily slipped together when the two shopping carts are nested together. Also, the upwardly angled portion of the bottom shelf helps keep goods on the shelf.

The longitudinally extending wire that projects downwardly below the bottom wire shelf may have a front portion within a plane of the bottom wire shelf and a center or rear portion below the plane of the bottom wire shelf. The center and rear portions may be contacted by the shield on the rear shopping cart when the two carts are nested together. As the carts are pushed into their nested orientation, the bottom shelf on the front cart will be lifted and rotated such that the bottom shelf of the rear shopping cart is received thereunder.

The advantage of the present approach is that all contact between the bottom shelves of the two shopping carts is limited to contact of a small area which may be protected by a small shield on the support bar of the rear cart and the single downwardly projecting wire on the bottom shelf of the front cart. Preferably, the optional shields are made of plastic (or other low-friction material). As such, the only contact is when the downwardly projecting wire slides across the face of the low-friction shield. This avoids metal-on-metal contact. In addition, the shield itself can be quite small and narrow as the wire that is dragged over it moves only in a longitudinal direction parallel to the axis of the wire, and slightly in a horizontal direction as carts can be nested at a slight angle to one another. In other embodiments, the shield is longer and can even extend the full side-to-side distance across the front of the bottom shelf. In yet other embodiments, this shield is optional and the downwardly projecting wire contacts the support bar of the rear cart. It is to be understood that embodiments both with and without the shield are encompassed within the scope of the present invention.

DETAILED DESCRIPTION OF THE DRAWINGS

Figure 1:
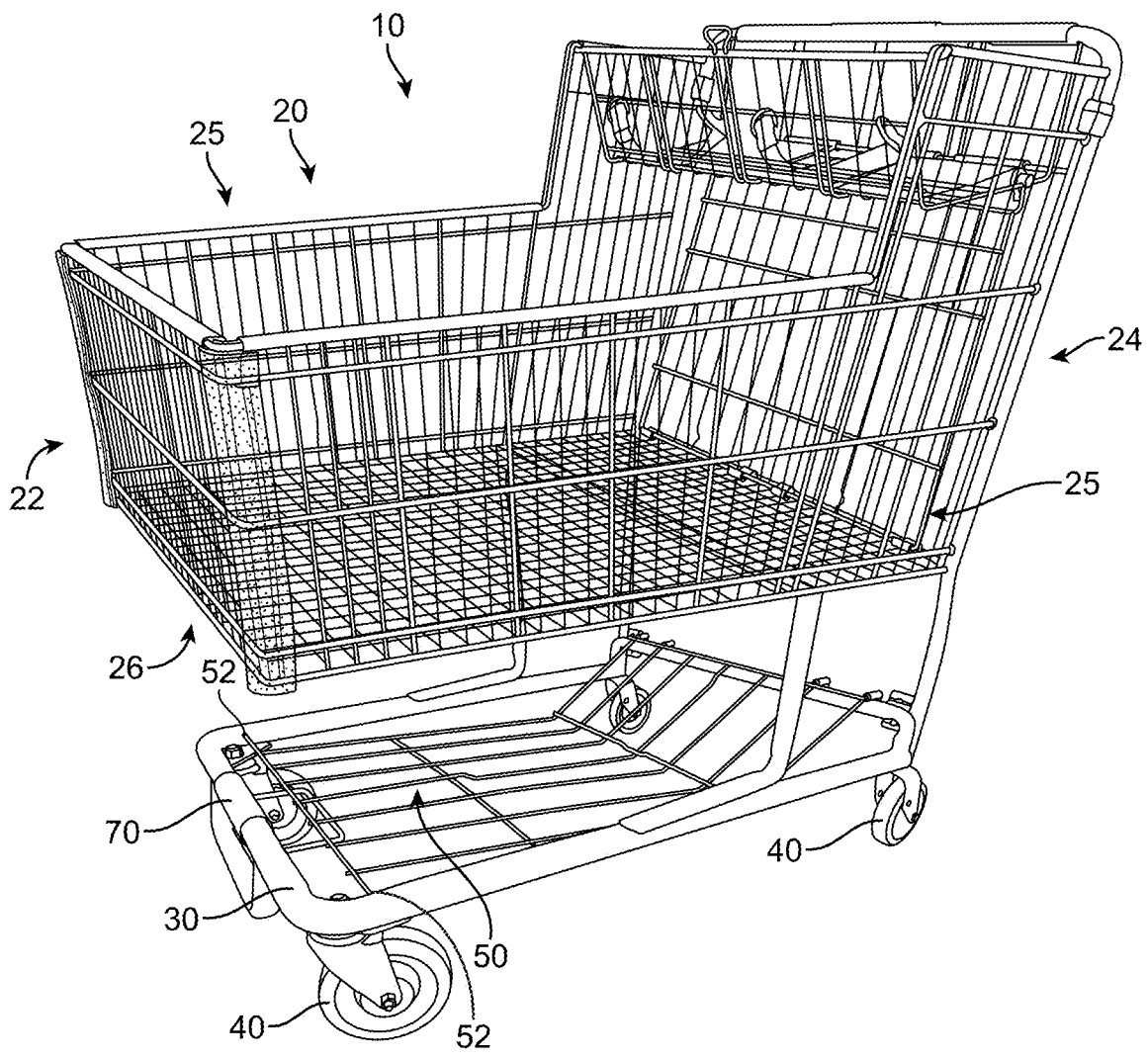
FIG. 1 is a perspective view of the present shopping cart.

Referring first to FIG. 1, a shopping cart that is ideally suited for nesting is provided. Shopping cart 10 has a wire frame basket 20 having a front 22, a back 24, two sides 25 and a bottom 26 all connected together.

Shopping cart 10 also includes a generally rectangular tubular bottom support 30 below the wire frame basket 20. Four wheels 40 are connected onto the bottom of bottom support 30. A bottom wire shelf 50 is positioned below wire frame basket 20 and is rotatably connected to bottom support 30 at pivot points 52.

Figure 2:
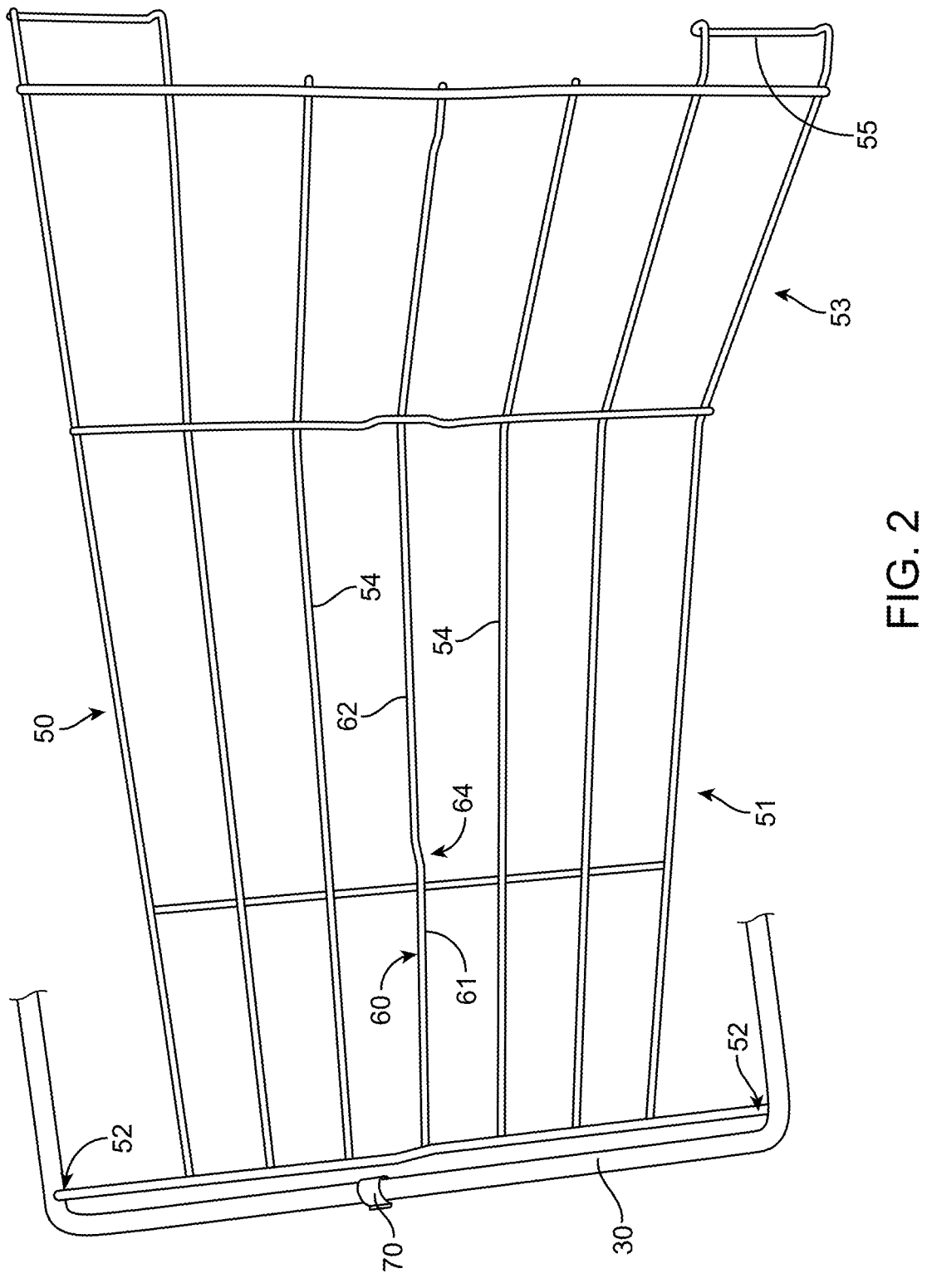
FIG. 2 is a perspective view of the bottom shelf and a portion of the support bar for the bottom shelf.
Figure 3:
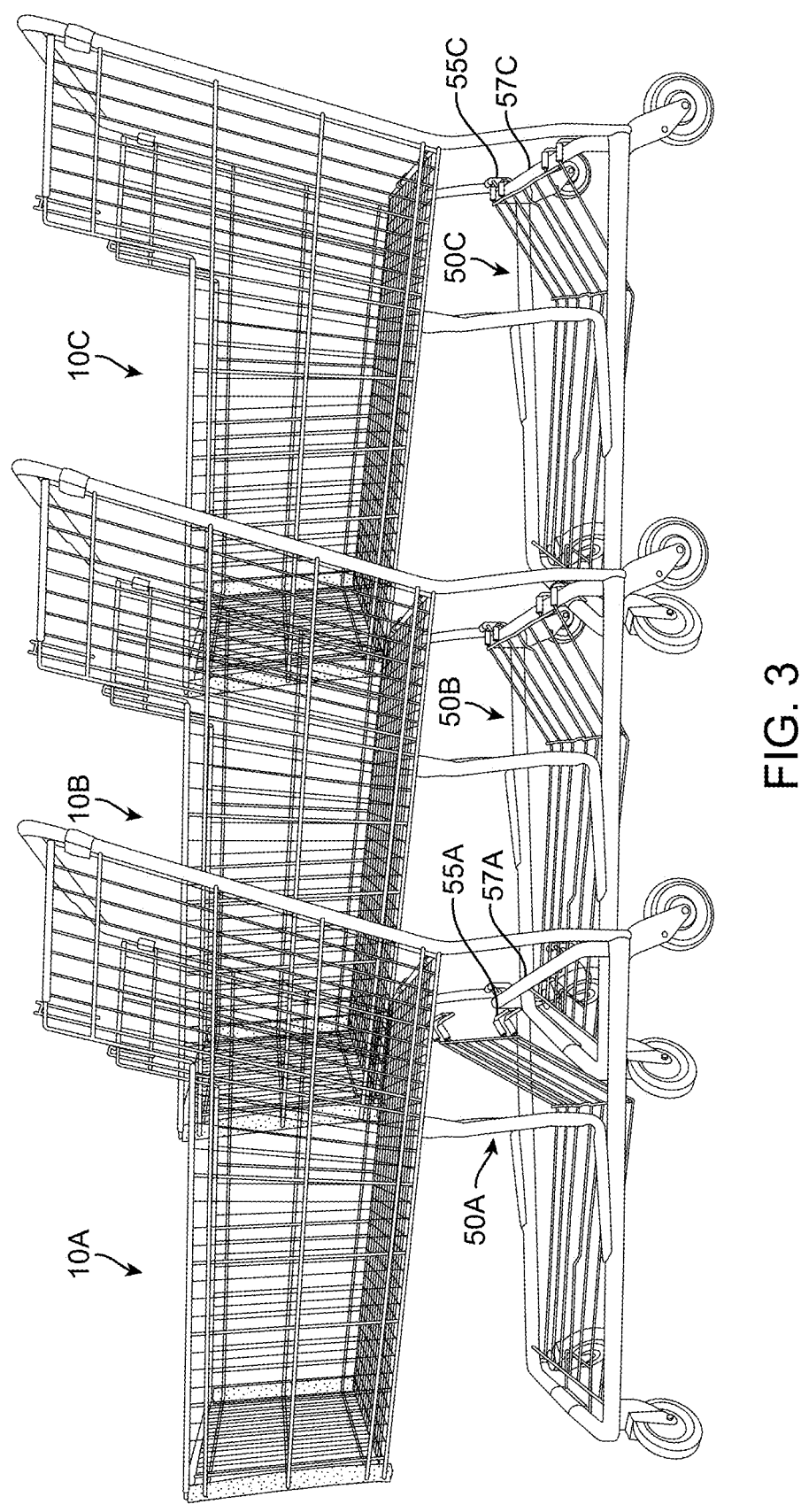
FIG. 3 is an illustration of three shopping carts being nested together.

Next, FIG. 2 shows a perspective view of the bottom shelf 50 and a portion of the front support bar for the bottom shelf. Bottom wire shelf 50 is rotatable with respect to bottom support 30 at pivot points 52 with its front wires received into holes in bottom support 30 (see also FIG. 1). As such, a rear portion of bottom wire shelf 50 can be raised when a bottom support 30 of a second nestable shopping cart is received thereunder. FIG. 3 shows three shopping carts 10A, 10B and 10C nested together.

Figure 4:
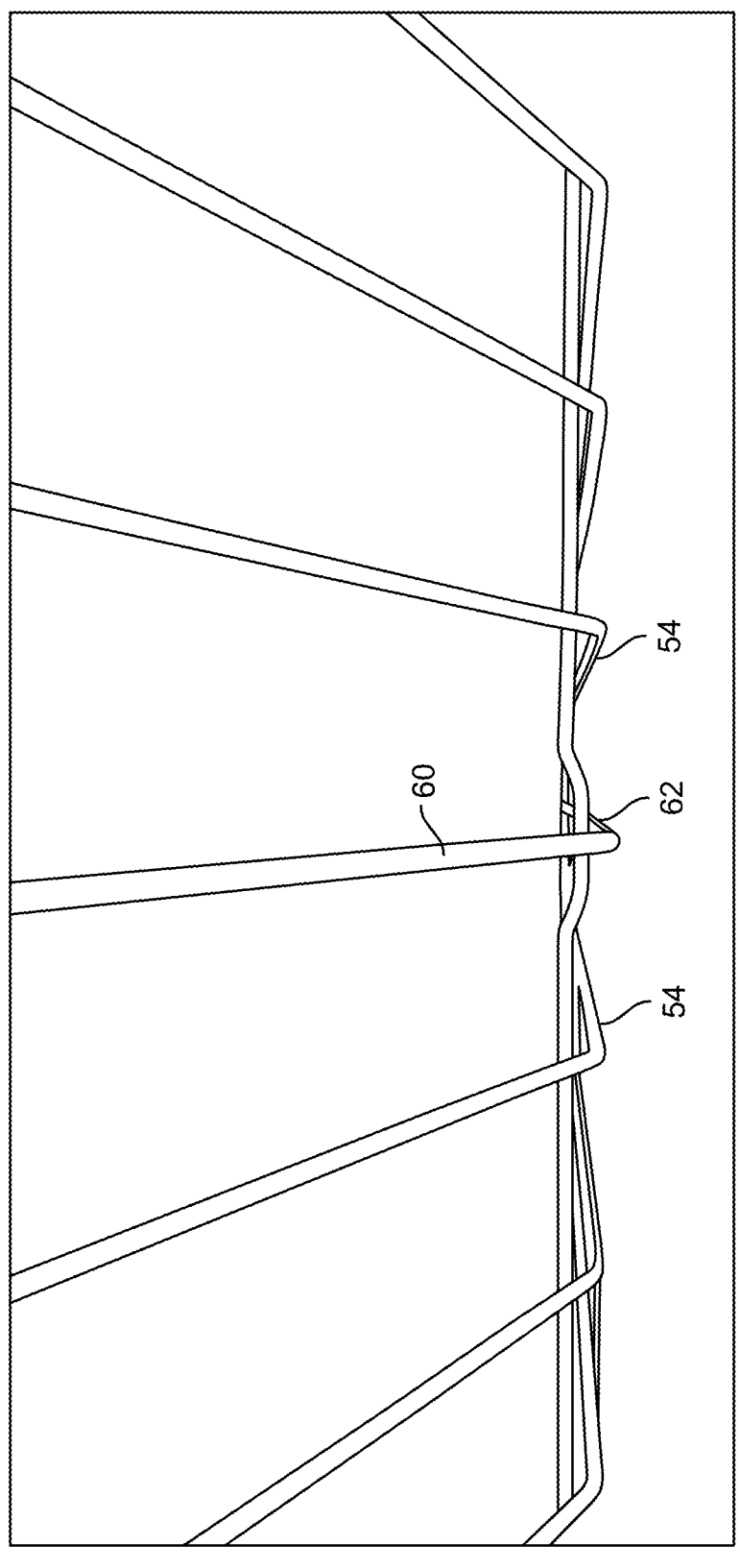
FIG. 4 is a rear elevation view of the bottom shelf.
Figure 5:
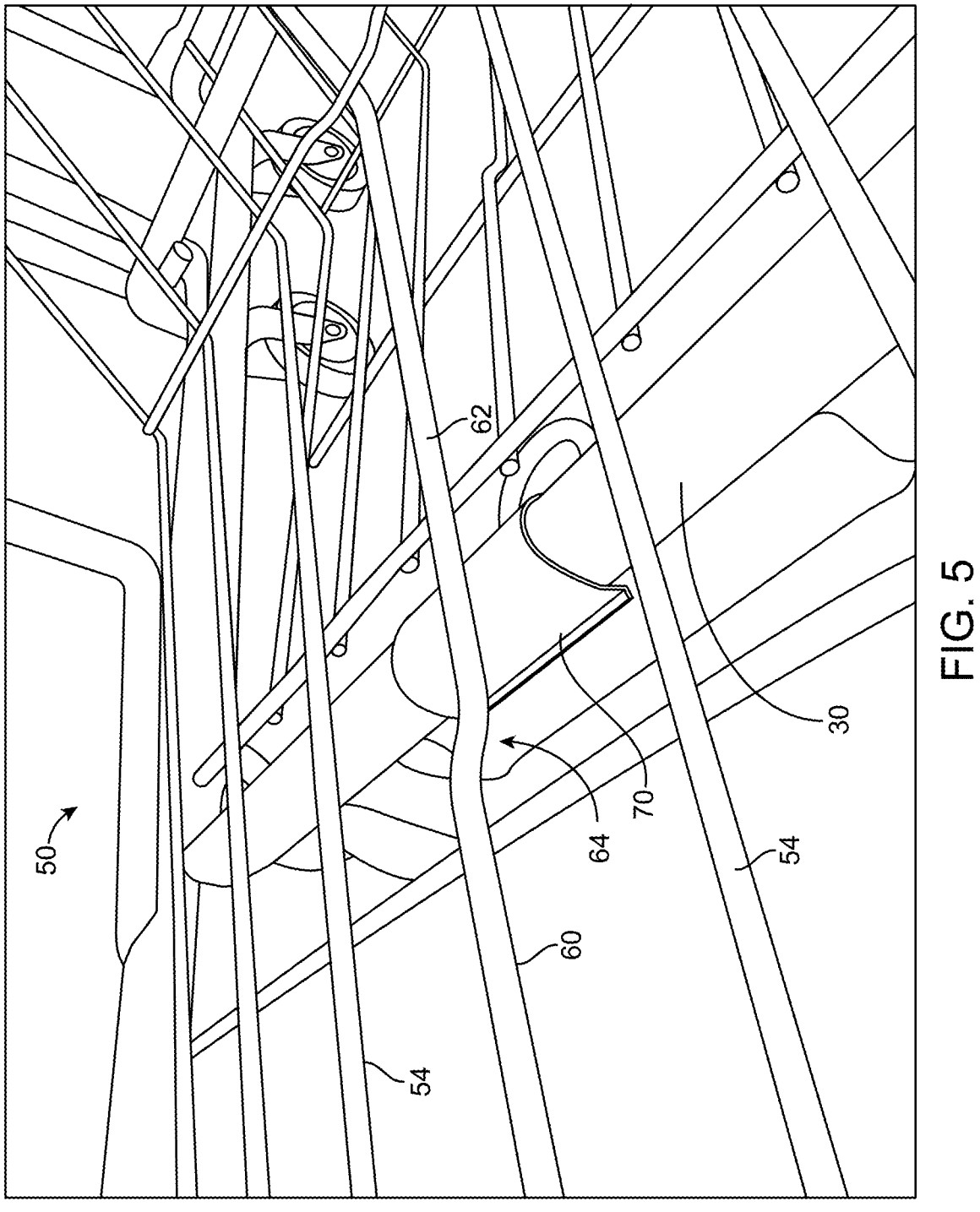
FIG. 5 is a perspective view showing the downwardly projecting wire of a first shopping cart contacting the optional shield on the bottom support of the second shopping cart.

As can also be seen in FIGS. 2 and 4, the bottom wire shelf 50 includes a longitudinally extending wire 60 having a portion that 62 projects downwardly below plane of the bottom of bottom wire shelf 50. As can be seen in FIG. 5, an optional shield 70 can be provided on bottom support 30. Optional shield 70 is positioned to contact the longitudinally extending wire portion 62 that projects downwardly below the bottom wire shelf on a first shopping cart when another shopping cart is nested together from behind. In some embodiments, optional shield 70 is small (e.g. 40 to 6 inches long). Shield 70 could also be longer and span the full distance across the front of the bottom support 30. Shield 70 may optionally be made of plastic and may snap-fit around the front end of bottom support 30. Optionally as well, the shield 70 may be omitted in its entirety, all keeping within the scope of the present invention.

Figure 6:
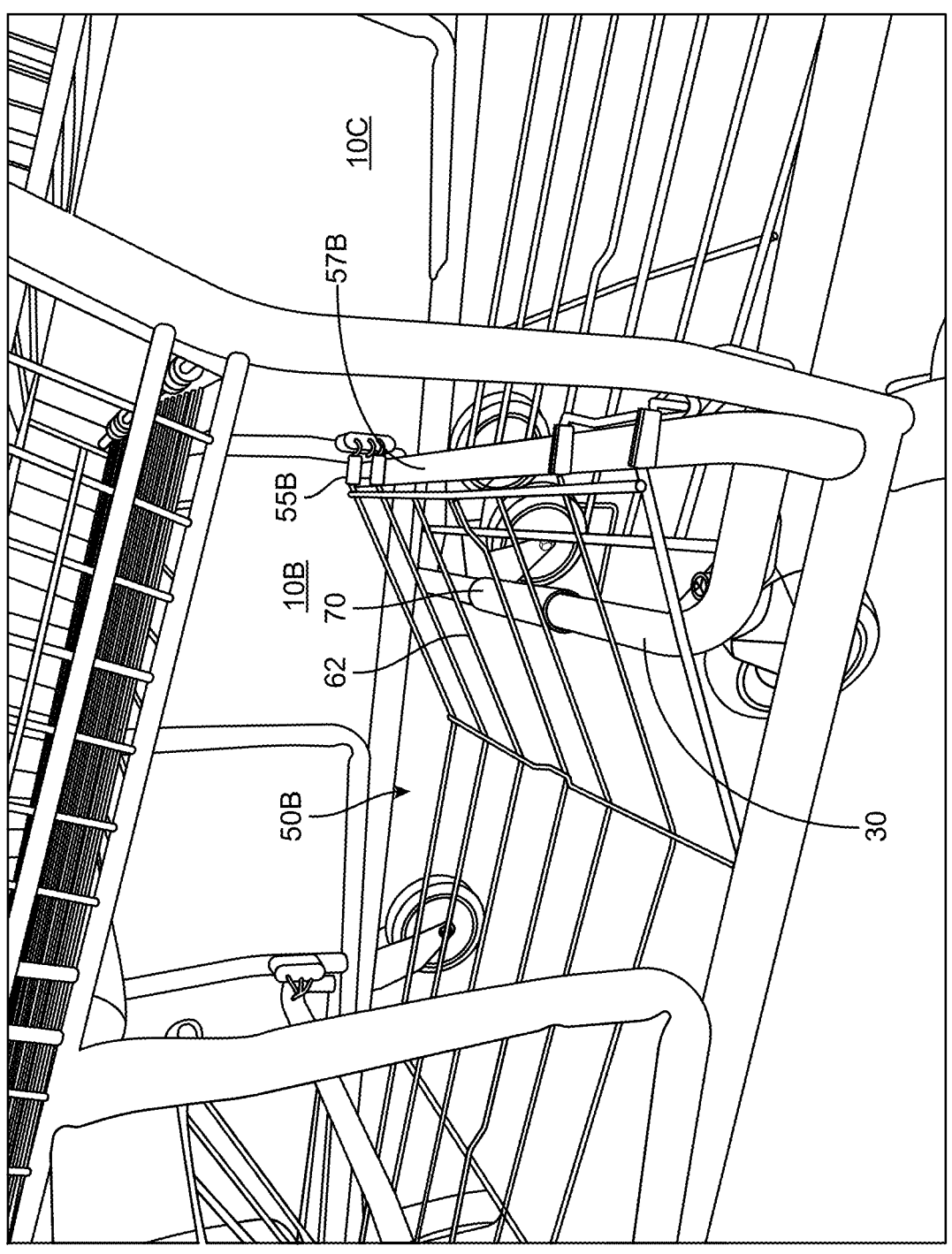
FIG. 6 is a perspective view of the rear portion of a bottom shelf on a first shopping cart about to be raised as a second shopping cart is about to be nested from behind.
Figure 7:
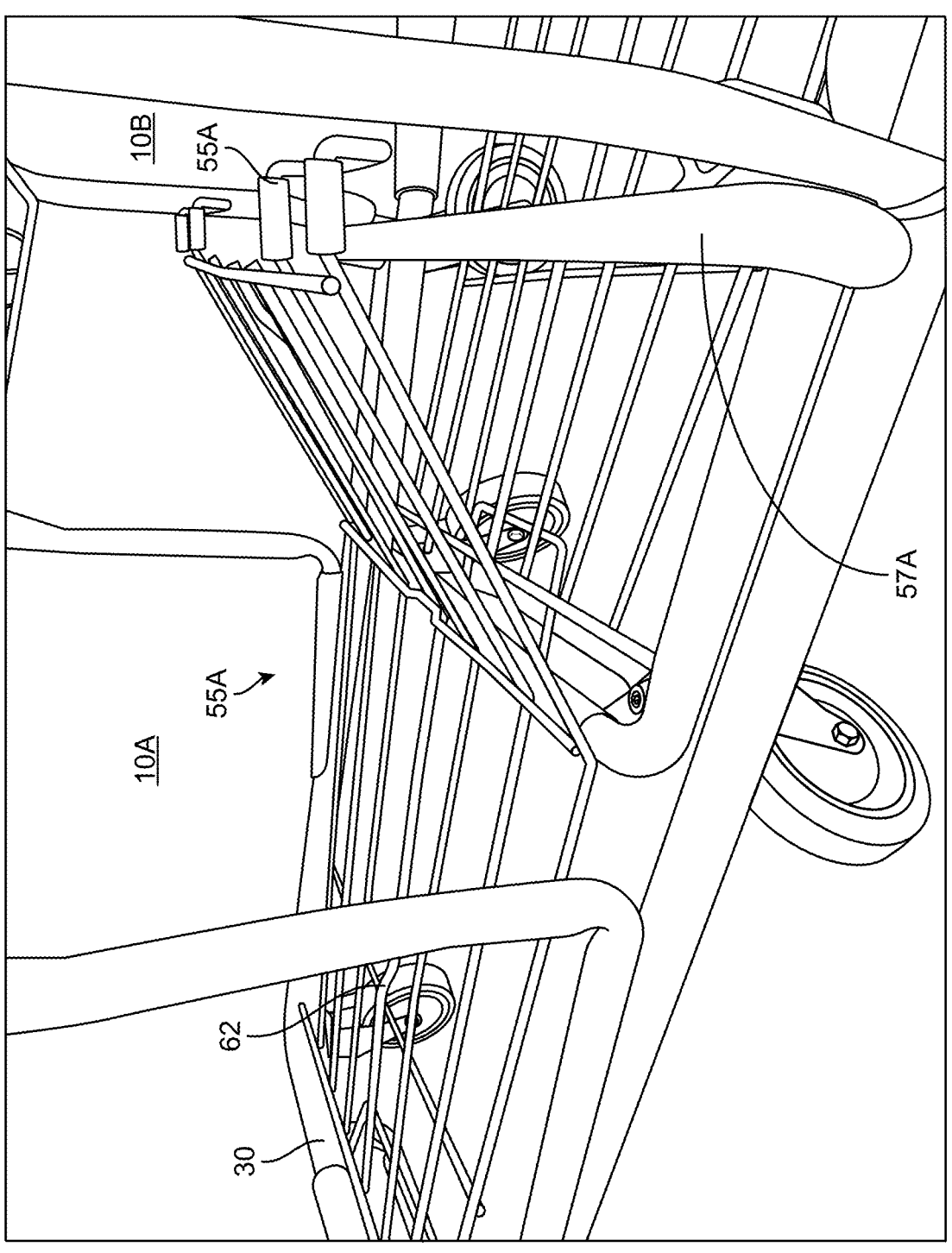
FIG. 7 corresponds to FIG. 6, but shows the bottom shelf in a raised position when the second shopping cart has been fully nested into the first shopping cart.

As can be seen in FIGS. 5 to 7, portion 62 of the longitudinally extending wire 60 projects downwardly below the bottom wire shelf 50 and rubs against optional shield 70 on the bottom support of the second nestable shopping cart when the first nestable shopping cart and the second nestable shopping cart are nested together. As best seen in FIG. 5, the advantage of this design is that the remaining wires 54 of the bottom wire shelf 50 do not contact the bottom support 30 of the second nestable shopping cart when first and second nestable shopping carts are nested together. As such, the only contact between the bottom shelves of the two shopping carts is between downwardly extending portion 62 (which is usually only one wire of bottom shelf 50) and the centrally positioned optional shield 70.

As seen in FIGS. 1, 2 and 3, bottom wire shelf 50 preferably has a front portion 51 disposed generally parallel to the ground, and an upwardly angled rear portion 53 disposed at an angle to the ground. Upwardly angled portion 53 helps in keeping groceries from falling off the back of the shelf as the shopping cart is driven through the store.

As can also be seen, the longitudinally extending wire 60 that projects downwardly below the bottom wire shelf preferably has a front portion 61 within a plane of the bottom wire shelf and a rear portion 62 below the plane of the bottom wire shelf 50. The front portion 61 and the rear portion 62 may be separated by an angled portion 64. Preferably, optional shield 70 on the bottom support 30 of a second nestable shopping cart contacts the angled portion 64 of the longitudinally extending wire 60 of the first nestable shopping cart when the shopping carts are nested together. As the two carts are pushed together, the rear portion 53 of the bottom shelf 50 will be pushed upwardly as bottom shelf 50 rotates around pivots 52 point near the front of bottom shelf 30.

FIG. 3 illustrates three shopping carts 10A, 10B and 10C nested together. As can be seen, the bottom shelf 50C is laying fully downward with its rear hooks 55C resting on its rear support 57C. Shopping cart 50C is only touching shopping cart 50B and is not nested therein. Shopping cart 10B is partially nested into the rear of shopping cart 10A. As such, the bottom shelf 50A on shopping cart 10A has been rotated upwardly, lifting hooks 55A away from rear support 57A.

Lastly, FIGS. 6 and 7 provide close-up illustrations of the nesting seen in FIG. 3. FIG. 6 illustrates the positions of shopping carts 10B and 10C, with bottom shelf 50B in its downward position. FIG. 7 shows shopping carts 10A and 10B nested together such that bottom shelf 55A has been rotated to lift rear hooks 55A away from its rear support 57A.

What is claimed is:

1. A nestable shopping cart, comprising:

a wire frame basket having a front, a back, two sides and a bottom connected together;

a bottom support extending downwardly below the wire frame basket;

a bottom wire shelf connected to the bottom support, the bottom wire shelf being positioned below the wire frame basket, wherein the bottom wire shelf is rotatable with respect to the bottom support such that a rear portion of the bottom wire shelf can be raised when a bottom support of a second nestable shopping cart is received thereunder when the nestable shopping cart and the second nestable shopping cart are nested together; and wherein the bottom wire shelf includes a longitudinally extending wire having a portion that projects downwardly below the bottom wire shelf, wherein the portion of the longitudinally extending wire that projects downwardly below the bottom wire shelf

5 rubs against the bottom support of the second nestable shopping cart when the nestable shopping cart and the second nestable shopping cart are nested together, and wherein remaining wires of the bottom wire shelf do not contact the bottom support of the second nestable shopping cart when the nestable shopping cart and the second nestable shopping cart are nested together.

2. The nestable shopping cart of claim 1; further comprising:

a shield on the bottom support, wherein the shield is positioned to contact the longitudinally extending wire that projects downwardly below the bottom wire shelf of the second nestable shopping cart.

3. The nestable shopping cart of claim 2, wherein the portion of the longitudinally extending wire that projects downwardly below the bottom wire shelf rubs against the shield on the bottom support of the second nestable shopping cart when the nestable shopping cart and the second nestable shopping cart are nested together.

4. The nestable shopping cart of claim 1, wherein the longitudinally extending wire that projects downwardly below the bottom wire shelf extends along the center of the bottom wire shelf.

5. The nestable shopping cart of claim 1, wherein the bottom wire shelf has a front portion disposed generally parallel to the ground, and an upwardly angled rear portion disposed at an angle to the ground.

6. The nestable shopping cart of claim 1, wherein the longitudinally extending wire that projects downwardly below the bottom wire shelf has a front portion within a plane of the bottom wire shelf and a rear portion below the plane of the bottom wire shelf.

7. The nestable shopping cart of claim 6, wherein the longitudinally extending wire has an angled portion connecting the front portion to the rear portion of the longitudinally extending wire.

8. The nestable shopping cart of claim 2, wherein the longitudinally extending wire has a portion connecting a front portion to a rear portion of the longitudinally extending wire, and wherein the shield on the bottom support of the second nestable shopping cart contacts a angled portion of the longitudinally extending wire of the nestable shopping cart when the nestable shopping cart and the second nestable shopping cart are nested together.

9. The nestable shopping cart of claim 1, wherein the bottom shelf rotates around a pivot point near the front of the bottom shelf.

10. The nestable shopping cart of claim 1, wherein the bottom support wraps around the front and the sides of the bottom wire shelf.

11. The nestable shopping cart of claim 1, wherein a shield wraps around a center portion of the bottom support.

12. A nestable shopping cart, comprising:

a wire frame basket having a front, a back, two sides and a bottom connected together;

a bottom support extending downwardly below the wire frame basket;

a bottom wire shelf connected to the bottom support, the bottom wire shelf being positioned below the wire frame basket, wherein the bottom wire shelf is rotatable with respect to the bottom support such that a rear portion of the bottom wire shelf can be raised;

wherein the bottom wire shelf includes a longitudinally extending wire having a portion that projects downwardly below the bottom wire shelf, wherein the portion of the longitudinally extending wire that projects downwardly below the bottom wire shelf rubs against the bottom support of a second nestable shopping cart when the nestable shopping cart and the second nestable shopping cart are nested together, and wherein remaining wires of the bottom wire shelf do not contact the bottom support of the second nestable shopping cart when the nestable shopping cart and the second nestable shopping cart are nested together.

13. The nestable shopping cart of claim 12, further comprising:

a shield on the bottom support.

14. The nestable shopping cart of claim 13, wherein the shield is made of a low-friction material.

15. The nestable shopping cart of claim 12, wherein the longitudinally extending wire that projects downwardly below the bottom wire shelf extends along the center of the bottom wire shelf.

16. The nestable shopping cart of claim 12, wherein the bottom wire shelf has a front portion disposed generally parallel to the ground, and an upwardly angled rear portion disposed at an angle to the ground.

17. The nestable shopping cart of claim 16, wherein the longitudinally extending wire has an angled portion connecting the front portion to the rear portion of the longitudinally extending wire.

18. The nestable shopping cart of claim 12, wherein the bottom shelf rotates around a pivot point near the front of the bottom shelf.

* * * * *